United States Patent
Hong

(10) Patent No.: US 12,376,065 B2
(45) Date of Patent: Jul. 29, 2025

(54) METHOD AND DEVICE FOR TRACKING TERMINAL, AND STORAGE MEDIUM

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 397 days.

(21) Appl. No.: 17/924,928

(22) PCT Filed: May 14, 2020

(86) PCT No.: PCT/CN2020/090187
§ 371 (c)(1),
(2) Date: Nov. 11, 2022

(87) PCT Pub. No.: WO2021/226918
PCT Pub. Date: Nov. 18, 2021

(65) Prior Publication Data
US 2023/0199697 A1    Jun. 22, 2023

(51) Int. Cl.
*H04W 64/00* (2009.01)
(52) U.S. Cl.
CPC ................. *H04W 64/00* (2013.01)
(58) Field of Classification Search
None
See application file for complete search history.

(56) References Cited

U.S. PATENT DOCUMENTS

| | | | |
|---|---|---|---|
| 2014/0149745 A1* | 5/2014 | Suh | H04L 9/3073 713/171 |
| 2016/0353397 A1 | 12/2016 | Jung et al. | |
| 2020/0052963 A1 | 2/2020 | Kim et al. | |
| 2020/0221408 A1* | 7/2020 | Lee | H04J 11/0076 |

FOREIGN PATENT DOCUMENTS

| | | |
|---|---|---|
| CN | 1678094 A | 10/2005 |
| CN | 104091374 A | 10/2014 |
| CN | 104185162 A | 12/2014 |
| CN | 104768225 A | 7/2015 |
| CN | 106507267 A | 3/2017 |
| EP | 2983437 A1 | 2/2016 |
| WO | WO 2019083596 A1 | 5/2019 |

OTHER PUBLICATIONS

European Patent Application No. 20936068.4, Search and Opinion dated Jan. 15, 2024, 7 pages.
Chinese Patent Application No. 202080000935.3, Office Action dated Aug. 25, 2021, 8 pages.
Chinese Patent Application No. 202080000935.3, English translation of Office Action dated Aug. 25, 2021, 8 pages.
Indian Patent Application No. 202247068478, Office Action dated Jan. 20, 2023, 5 pages.
PCT/CN2020/090187 International Search Report dated Feb. 18, 2021; 3 pages.

* cited by examiner

*Primary Examiner* — Frantz Bataille
(74) *Attorney, Agent, or Firm* — Cozen O'Connor

(57) ABSTRACT

A method for tracking a terminal, performed by a base station, includes: transmitting a first signaling to at least one terminal in a coverage area, in which the at least one terminal transmits its own terminal ID in accordance with the first signaling.

18 Claims, 15 Drawing Sheets transmitting a first signaling to at least one terminal in a coverage area — 101 transmitting a second signaling to the at least one terminal — 102

METHOD AND DEVICE FOR TRACKING TERMINAL, AND STORAGE MEDIUM

CROSS-REFERENCE TO RELATED APPLICATION

This application is the national phase of International Application No. PCT/CN2020/090187, filed on May 14, 2020, the content of which is hereby incorporated by reference into this disclosure.

TECHNICAL FIELD

The disclosure relates to the field of communications, and in particular to, a method and device for tracking a terminal, and a storage medium.

BACKGROUND

An increasing number of applications based on $5^{th}$ generation mobile network (5G) technologies are emerging as 5G technologies are developed, and as 5G networks and 5G terminals are popularized and in widespread use.

Currently, a base station can track a terminal in a connected state, and a network side can track to a tracking area (TA) level. That is, a core network can determine a TA located by a terminal in a connected state, but may not know information on other terminals around the terminal.

SUMMARY

According to a first aspect of the disclosure, a method for tracking a terminal is provided, applicable to a base station, including: transmitting a first signaling to at least one terminal in a coverage area, in which the at least one terminal transmits its own terminal ID in accordance with the first signaling.

According to a second aspect of the disclosure, a method for tracking a terminal is provided, applicable to a terminal, including: receiving a first signaling from a base station; and transmitting its own terminal ID according to the first signaling.

According to a third aspect of embodiments of the disclosure, a device for tracking a terminal is provided, applicable to a base station, including: a processor; and a memory for storing instructions executable by processor; in which the processor is configured to perform the method for tracking a terminal according to any in the first aspect.

According to a fourth aspect of embodiments of the disclosure, a device for tracking a terminal is provided, applicable to a terminal, including: a processor; and a memory for storing instructions executable by processor; in which the processor is configured to perform the method for tracking a terminal according to any in the second aspect.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Figure 1:
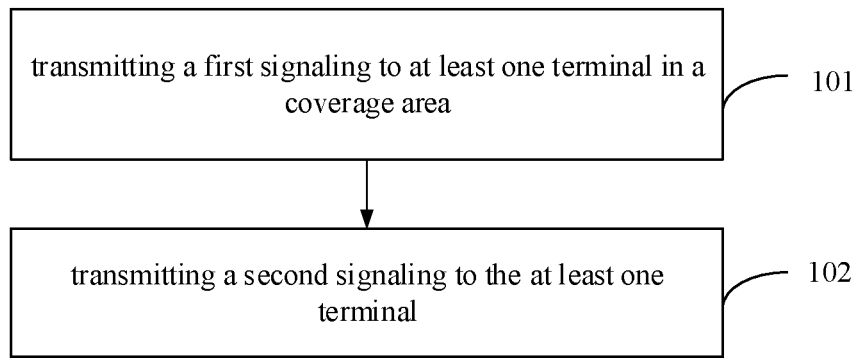
FIG. 1 is a flowchart of a method for tracking a terminal performed by a base station, according to some embodiments.

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the disclosure. Instead, they are merely examples of apparatuses and methods consistent with aspects related to the disclosure as recited in the appended claims.

The terminology used in the disclosure is for the purpose of describing examples only and is not intended to limit the disclosure. As used in the disclosure and the appended claims, the singular forms "a," "an" and "the" are intended to include the plural forms as well, unless the context clearly indicates otherwise. It shall also be understood that the terms "and/or" used herein are intended to signify and include any or all possible combinations of one or more of the associated listed items.

It shall be understood that, although the terms "first," "second," "third," and the like may be used herein to describe various information, the information should not be limited by these terms. These terms are only used to distinguish one category of information from another. For example, without departing from the scope of the disclosure, first information may be termed as second information; and similarly, second information may also be termed as first information. As used herein, the term "if" may be understood to mean "when" or "upon" or "in response to" depending on the context.

The following introduces a method for tracking a terminal, provided in the disclosure, from a base station side.

Embodiments of the disclosure provide a method for tracking a terminal, which may be applicable to a base station. The method may include the following step.

In step 101, a first signaling is transmitted to at least one terminal in a coverage area.

In some embodiments of the disclosure, the first signaling may cause the at least one terminal to transmit its own terminal ID. The at least one terminal in the coverage area of the base station may be in a connected state, an idle state, or an inactive state, which is not limited in the disclosure.

In the foregoing embodiments, the base station may transmit the first signaling to the at least one terminal in its own coverage area, so that the at least one terminal transmits its own terminal ID. The at least one terminal is not limited to the terminal in the connected state, but may also the terminal in the idle state or the inactive state, so as to achieve the purpose of tracking terminals in different states.

In some embodiments, when the at least one terminal includes a terminal in a target state, the first signaling is a broadcast signaling. The target state includes an idle state, an inactive state, or a connected state. Optionally, the broadcast signaling may use a newly added SIB signaling.

If the at least one terminal includes only a terminal in a connected state, the first signaling is a unicast signaling. Optionally, the unicast signaling may use a RRC reconfiguration signaling.

In some embodiments of the disclosure, when the at least one terminal includes a terminal in an idle state or an inactive state, and a terminal in a connected state, the base station may also transmit the broadcast signaling to the terminal in the idle state or inactive state, and transmit the unicast signaling to the terminal in the connected state, which to cause terminals in different states to transmit their own terminal IDs.

In the above-mentioned embodiments, the base station transmitting the broadcast signaling or unicast signaling make the terminal to transmit its own terminal ID, so that the purpose of tracking terminals in different states in the coverage area can be achieved, which is simple to implement and has high availability.

In some embodiments, the first signaling transmitted by the base station also carries first configuration information, and the first configuration information is configured to inform the at least one terminal of transmitting configuration information when transmitting its own terminal ID.

Optionally, the first configuration information includes at least one of: at least one of a transmission frequency and a transmission time period when transmitting the terminal ID, content of the transmitted terminal ID, an algorithm used when transmitting the terminal ID, a resource location when transmitting the terminal ID; a communication mode used when transmitting the terminal ID, or a signal transmission power used when transmitting the terminal ID.

The content of the terminal ID may include at least one of: a serving-temporary mobile subscriber identity (S-TMSI), a temporary mobile subscriber identity (TMSI), a random number for identifying the terminal, or identification information obtained after adding a preset field before the terminal ID.

S-TMSI and TMSI are terminal IDs of 5G terminals. The random number for identifying the terminal may be a random number generated by the terminal during random access and used to identify the terminal. The preset field can be a field used to identify the purpose of transmitting its own terminal ID. For example, during an epidemic, the purpose of transmitting its own terminal ID can be to identify other user(s) who appear around a certain user, or the preset field can also be a pre-appointed field in a protocol, such as a field used to identify an operator.

The algorithm used when transmitting the terminal ID may be a pseudo-random algorithm or other algorithms, which is not limited in the disclosure.

The resource location when transmitting the terminal ID includes but is not limited to at least one of: a time domain resource location, a frequency domain resource location, a space domain resource location, or a code domain resource location. The communication mode used when transmitting the terminal ID includes but is not limited to any of: New Radio (NR), Device-to-Device (D2D), Bluetooth, Wireless Fidelity (Wi-Fi), or Ultra Wide Band (UWB).

After the terminal receives the first signaling, and when transmitting its own terminal ID, it can transmit based on the first configuration information in the first signaling, which has high availability.

Further, referring to FIG. 1, FIG. 1 is a flowchart of a method for tracking a terminal, according to some embodiments. The method may further include the following step.

In step 102, a second signaling is transmitted to the at least one terminal.

The second signaling at least is configured to cause the at least one terminal to receive a terminal ID transmitted by other terminal. In some embodiments of the disclosure, the terminal receives terminal ID(s) transmitted by other terminal(s) in its own communication range, so that it can subsequently determine other terminal(s) around itself.

In the above-mentioned embodiments, the base station may also transmit the second signaling to the at least one terminal in its own coverage area, so that the at least one terminal receives the terminal ID transmitted by the other terminal according to the second signaling, and the information on the other terminal around the terminal can be determined, so as to achieve the purpose of tracking terminals.

In an optional implementation, similarly, when the at least one terminal includes a terminal in a target state, the second signaling is a broadcast signaling. The target state is an idle state, an inactive state, or a connected state. Optionally, the broadcast signaling may use a newly added SIB signaling.

If the at least one terminal includes only a terminal in a connected state, the second signaling is a unicast signaling. Optionally, the unicast signaling may adopt a RRC reconfiguration signaling.

In some embodiments of the disclosure, when the at least one terminal includes a terminal in an idle state or an inactive state, and a terminal in a connected state, the base station may also transmit the broadcast signaling to the terminal in the idle state or inactive state, and transmit the unicast signaling to the terminal in the connected state, to cause terminals in different states to transmit their own terminal IDs.

In some embodiments, when the second signaling is the unicast signaling, the base station may also use the second signaling to pre-configure the terminal in the connected state, so that after the terminal in the connected state changes to the inactive state or the idle state, the terminal ID transmitted by the other terminal is received.

In some embodiments, the second signaling may also carry second configuration information, in which the second configuration information is configured to inform the at least one terminal of receiving configuration information when receiving the terminal ID transmitted by the other terminal.

Optionally, the second configuration information includes at least one of: at least one of a frequency and a time period when receiving the terminal ID transmitted by the other terminal, content of the received terminal ID transmitted by the other terminal, a resource location when receiving the terminal ID transmitted by the other terminal; a communication mode used when receiving the terminal ID transmitted by the other terminal, or a receiving condition when receiving the terminal ID transmitted by the other terminal.

The content of the received terminal ID transmitted by the other terminal may be a S-TMSI, a TMSI, a random number for identifying the terminal, or identification information obtained by adding a preset field before the terminal ID. The resource location when receiving the terminal ID transmitted by the other terminal includes but is not limited to at least one of: a time domain resource location, a frequency domain resource location, a space domain resource location, or a code domain resource location. The communication mode used when receiving the terminal ID transmitted by the other terminal includes but is not limited to any of: NR, D2D, Bluetooth, Wi-Fi, or UWB. The receiving condition when receiving the terminal ID transmitted by the other terminal may be that a frequency of transmitted signals of the other terminal meets a threshold condition, in which the threshold condition may be greater than a first threshold and/or less than a second threshold.

In some embodiments of the disclosure, in addition to causing the at least one terminal to receive the terminal ID transmitted by the other terminal, the second signaling is further configured to cause the at least one terminal to store association information associated with the received terminal ID after receiving the terminal ID transmitted by the other terminal.

The second signaling may cause the at least one terminal to receive the terminal ID transmitted by the other terminal and store the association information associated with the received terminal ID through different information fields or information units.

Optionally, when the second signaling causes the at least one terminal to store the association information associated with the received terminal ID after receiving the terminal ID transmitted by the other terminal, the second signaling may use a LoggedMeasurementConfiguration signaling in the RRC reconfiguration signaling.

The association information may include at least one of: time when receiving the terminal ID transmitted by the other terminal, content of the received terminal ID transmitted by the other terminal, information on a base station connected when a current terminal is in the connected state or information on a base station that resides when the current terminal is in the idle state or inactive state, or geographic location information of the current terminal when receiving the terminal ID transmitted by other terminal.

In the above embodiments, after receiving the second signaling, the terminal can receive the terminal ID transmitted by the other terminal according to the second signaling, and store the corresponding association information, so that it can be subsequently reported to the base station to determine information on the other terminal around the terminal, which is easy to implement and highly usable.

Figure 2:
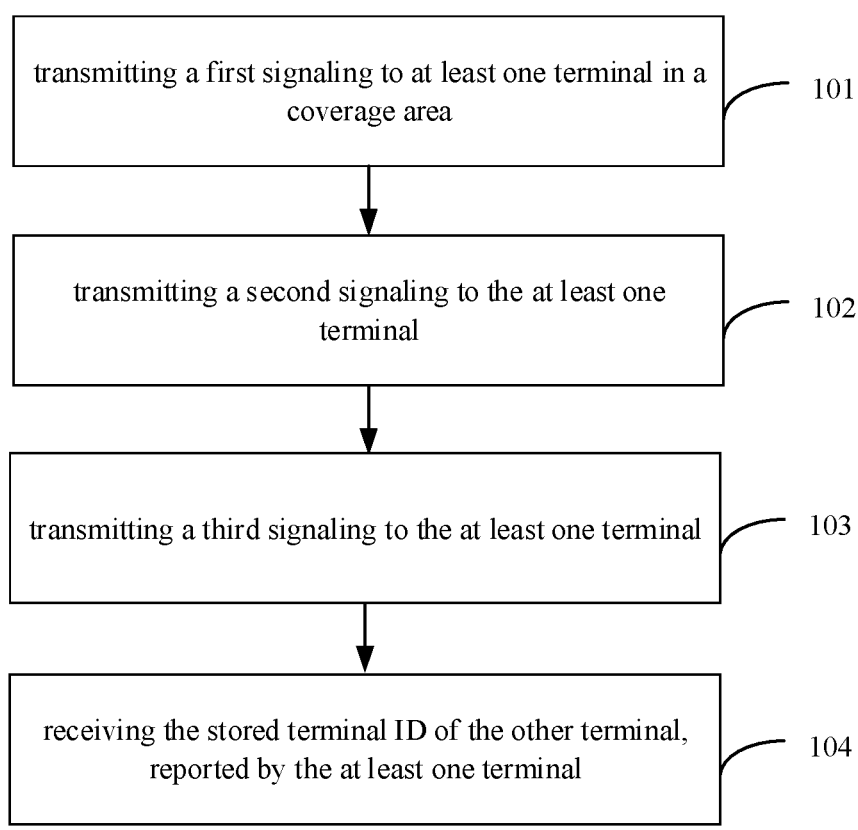
FIG. 2 is a flowchart of another method for tracking a terminal, according to some embodiments.

In some embodiments, referring to FIG. 2, FIG. 2 is a flowchart of another method for tracking a terminal, according to some embodiments in FIG. 1. The method may further include the following steps.

In step 103, a third signaling is transmitted to the at least one terminal.

The third signaling is configured to cause the at least one terminal to report a stored terminal ID of the other terminal.

In step 104, the stored terminal ID of the other terminal, reported by the at least one terminal, is received.

In the foregoing embodiments, the base station may also transmit the third signaling to the at least one terminal, so that the terminal reports the stored terminal ID of the other terminal according to the third signaling. In this way, the information of multiple terminals around the terminal is determined, and the purpose of tracking terminals is realized.

Similarly, when the at least one terminal includes a terminal in a target state, the third signaling is a broadcast signaling. The target state is an idle state, an inactive state, or a connected state. Optionally, the broadcast signaling may use a newly added SIB signaling.

If the at least one terminal includes only a terminal in a connected state, the third signaling is a unicast signaling. Optionally, the unicast signaling may adopt a RRC reconfiguration signaling.

In some embodiments of the disclosure, when the at least one terminal includes a terminal in an idle state or an inactive state, and a terminal in a connected state, the base station may also transmit the broadcast signaling to the terminal in the idle state or inactive state, and transmit the unicast signaling to the terminal in the connected state, to cause terminals in different states to transmit their own terminal IDs.

In some embodiments, whether the third signaling is the broadcast signaling or the unicast signaling, a third terminal in the at least one terminal may only report the designated terminal ID, or the third terminal may report all stored terminal IDs of other terminals. The third terminal is a terminal stored with the designated terminal ID.

In some embodiments of the disclosure, the designated terminal ID may be a specific terminal ID. For example, during an epidemic, the designated terminal ID may be the terminal ID corresponding to the user of the confirmed case. The base station uses the third signaling to cause the third terminal that stores the designated terminal ID to report the designated terminal ID to determine which users have had close contact with the user with the confirmed case. Or the base station uses the third signaling to cause the third terminal that stores the designated terminal ID to report all the stored terminal IDs of other terminals, so as to determine which users have had close contact with the user with the confirmed case, and which users have had close contact with those users who have had close contact with the user with the confirmed case.

In the above-mentioned embodiments, the third terminal can be caused to report its stored designated terminal ID or all stored terminal IDs of other terminals, which can better perform terminal tracking, which is easy to implement and has high availability.

In some embodiments, the third signaling is configured to cause a fourth terminal in the at least one terminal to report the stored terminal ID of the other terminal, in which the fourth terminal is a terminal corresponding to the designated terminal ID.

Also taking the epidemic situation as an example, the designated terminal ID can be the terminal ID corresponding to the user of the confirmed case. The base station uses the third signaling to cause the terminal corresponding to the user of the confirmed case directly report the stored terminal ID(s) of other terminal(s) to determine which user(s) has had close contact with the user with the confirmed case.

In the above-mentioned embodiments, the fourth terminal can be caused to report the stored terminal ID(s) of other terminal(s) to better perform terminal tracking, which is simple to implement and has high availability.

Figure 3A:
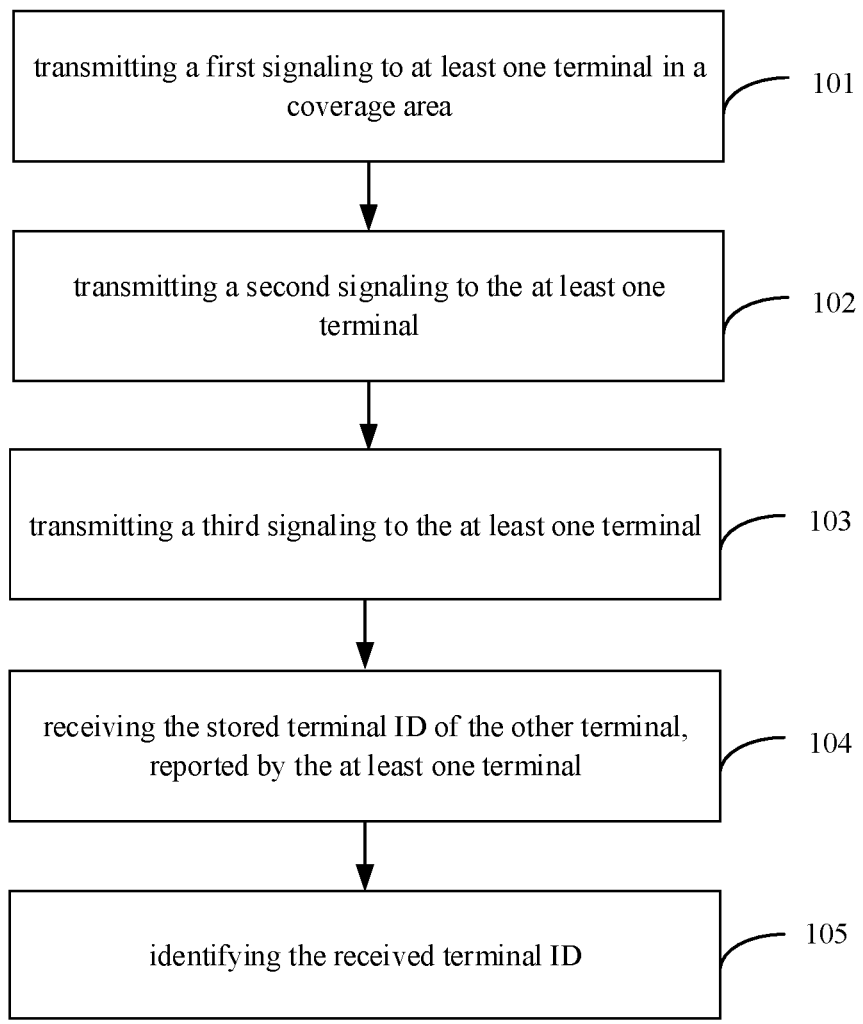
FIG. 3A is a flowchart of method for tracking and identifying a terminal performed by a base station, according to some embodiments.

In some embodiments, referring to FIG. 3A, FIG. 3A is a flowchart of another method for tracking a terminal, according to some embodiments in FIG. 2. The method may further include the following step.

In step 105, the received terminal ID is identified.

In embodiments of the disclosure, the base station can identify the terminal ID of the other terminal, reported by the terminal, for example, determine the ID number, name and other information, so as to correspond to a specific user.

Figure 3B:
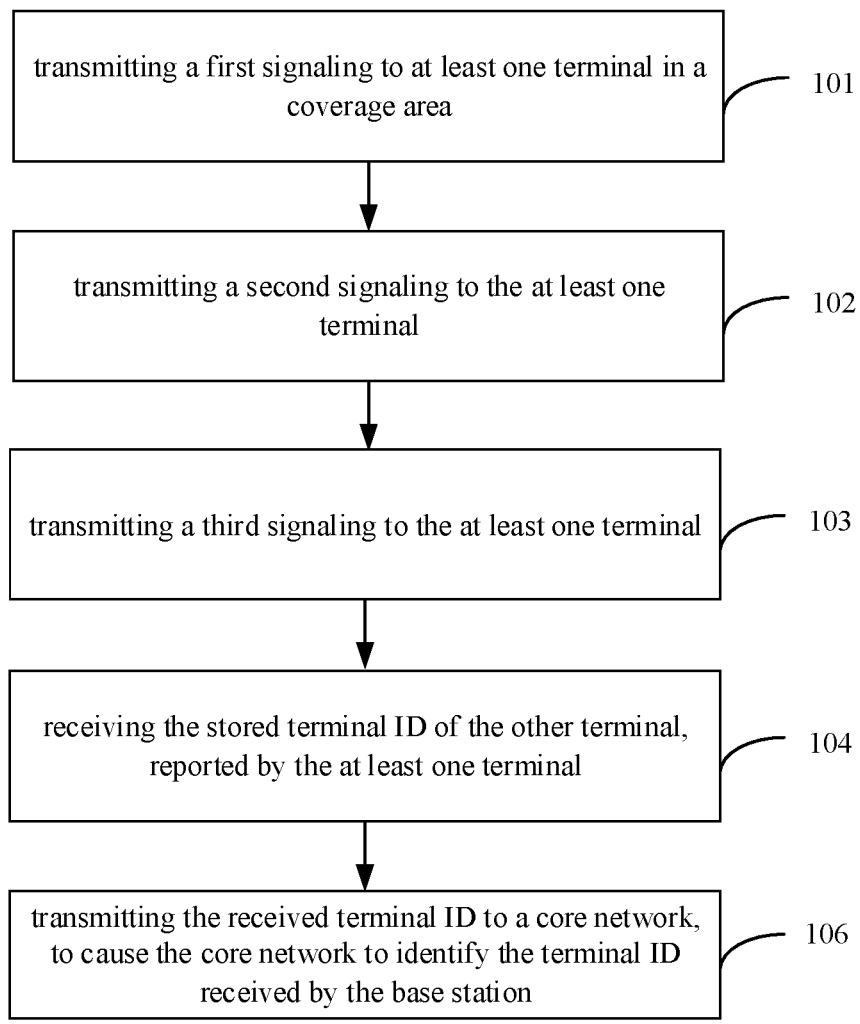
FIG. 3B is a flowchart of another method for tracking and identifying a terminal, according to some embodiments.

In some embodiments, referring to FIG. 3B, FIG. 3B is a flowchart of another method for tracking a terminal, according to some embodiments in FIG. 2. The method may further include the following step.

In step 106, the received terminal ID is transmitted to the core network, and the core network identify the terminal ID received by the base station.

In some embodiments of the disclosure, the base station may not perform identity recognition, but the core network may perform identity recognition, which can also correspond to the specific user, for example, it is determined that Li Si and Wang Wu appear around Zhang San.

The following introduces a method for tracking a terminal, provided in the disclosure, from a terminal side.

Figure 4:
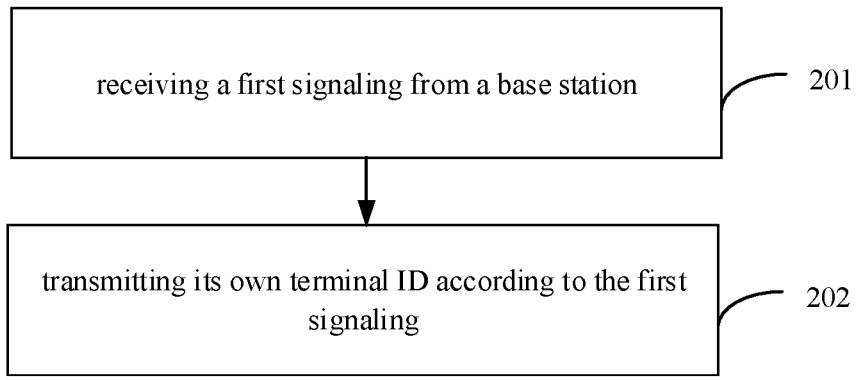
FIG. 4 is a flowchart of method for tracking a terminal performed by a terminal, according to some embodiments.

Referring to FIG. 4, FIG. 4 is a flowchart of another method for tracking a terminal, according to some embodiments. The method may include the following steps.

In step 201, a first signaling transmitted by a base station is received.

In some embodiments of the disclosure, the first signaling is a signaling used to cause the terminal to transmit its own terminal ID.

In step 202, its own terminal ID is transmitted according to the first signaling.

By transmitting its own terminal ID, its own terminal ID can be received by other terminal(s) around the terminal, thus achieving the purpose of tracking terminals.

In some embodiments, if the terminal is in a connected state, the first signaling is a broadcast signaling or unicast signaling, and if the terminal is in an idle state or inactive state, the first signaling is a broadcast signaling.

In some embodiments, the first signaling carries first configuration information. When the terminal transmits its own terminal ID, it may transmit based on the first configuration information, which may include at least one of the following.

The terminal transmits its own terminal ID based on at least one of a transmission frequency and a transmission time period in the first configuration information. The content of the transmitted terminal ID may be a S-TMSI, a TMSI, a random number for identifying the terminal, or identification information obtained after adding a preset field before the terminal ID. The terminal transmits its own terminal ID based on an algorithm indicated in the first configuration information. The terminal transmits its own terminal ID at a resource location indicated in the first configuration information. The terminal transmits its own terminal ID based on a communication mode indicated in the first configuration information. The terminal transmits its own terminal ID based on a signal transmission power indicated in the first configuration information.

In the foregoing embodiments, the terminal can transmit its own terminal ID according to the first configuration information carried in the first signaling, which has high availability.

Figure 5:
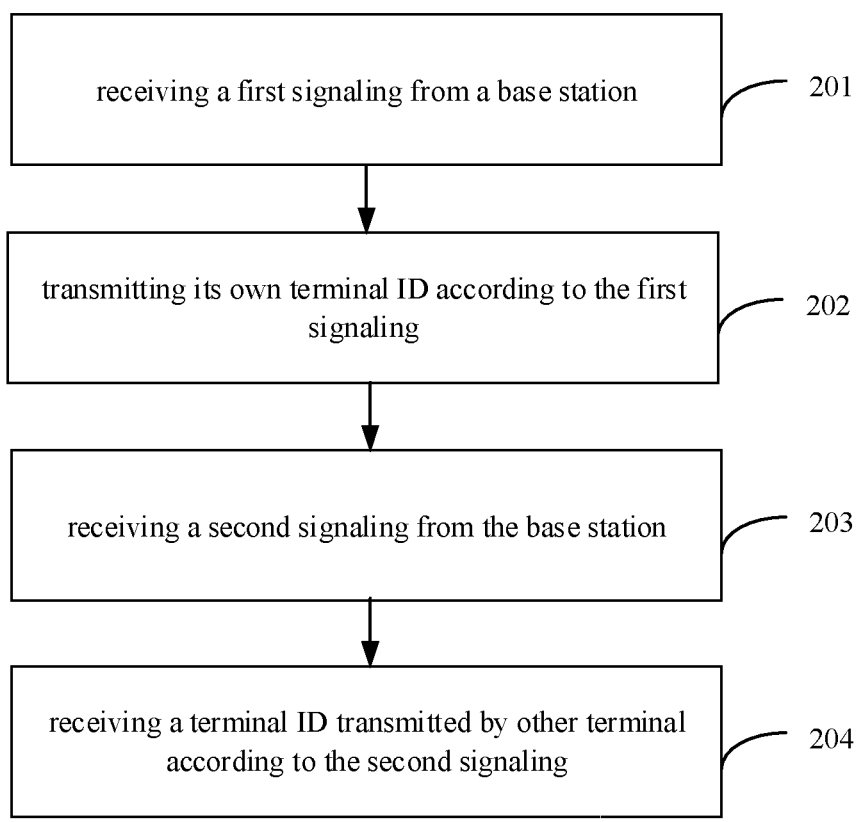
FIG. 5 is a flowchart of another method for tracking a terminal performed by a terminal, according to some embodiments.

In some embodiments, referring to FIG. 5, FIG. 5 is a flowchart of another method for tracking a terminal, according to some embodiments in FIG. 4. The method may further include the following steps.

In step 203, a second signaling transmitted by the base station is received.

The second signaling is a signaling used to instruct the terminal to receive a terminal ID transmitted by other terminal.

In step 204, a terminal ID transmitted by other terminal is received according to the second signaling.

In the foregoing embodiments, the terminal may receive terminal IDs transmitted by multiple other terminals around itself according to the second signaling, thereby achieving the purpose of determining other terminals appearing around the terminal.

Similarly, when the terminal is in a connected state, the second signaling is a broadcast signaling or unicast signaling; and when the terminal is in an idle state or in an inactive state, the second signaling is a broadcast signaling.

In some embodiments, step 204 may include the following. The terminal is currently in the connected state, and after the state of the terminal is switched to the inactive state or the idle state, it receives the terminal ID transmitted by the other terminal.

In some embodiments of the disclosure, the terminal can now receive terminal ID(s) transmitted by other terminal(s). In addition, it can also receive terminal ID(s) transmitted by other terminal(s) after switching to the inactive state or the idle state.

In the foregoing embodiments, the purpose of pre-configuring the terminal is achieved, and the usability is high.

In some embodiments, whether the second signaling is the unicast signaling or the broadcast signaling, it can carry second configuration information, and the terminal can receive the terminal ID transmitted by the other terminal according to the second configuration information, which includes at least one of the following.

The terminal can receive the terminal ID transmitted by the other terminal according to at least one of a frequency and a time period, indicated in the second configuration information. The terminal can receive at least one of: a S-TMSI, a TMSI, a random number for identifying the terminal, or identification information obtained after adding a preset field before the terminal ID, transmitted by the other terminal, according to content of the terminal ID indicated in the second configuration information. The terminal can receive the terminal ID transmitted by the other terminal according to a resource location indicated in the second configuration information. The terminal can receive the terminal ID transmitted by the other terminal according to a communication mode indicated in the second configuration information. The terminal can receive the terminal ID transmitted by the other terminal according to a receiving condition indicated in the second configuration information when the receiving condition is satisfied.

Figure 6:
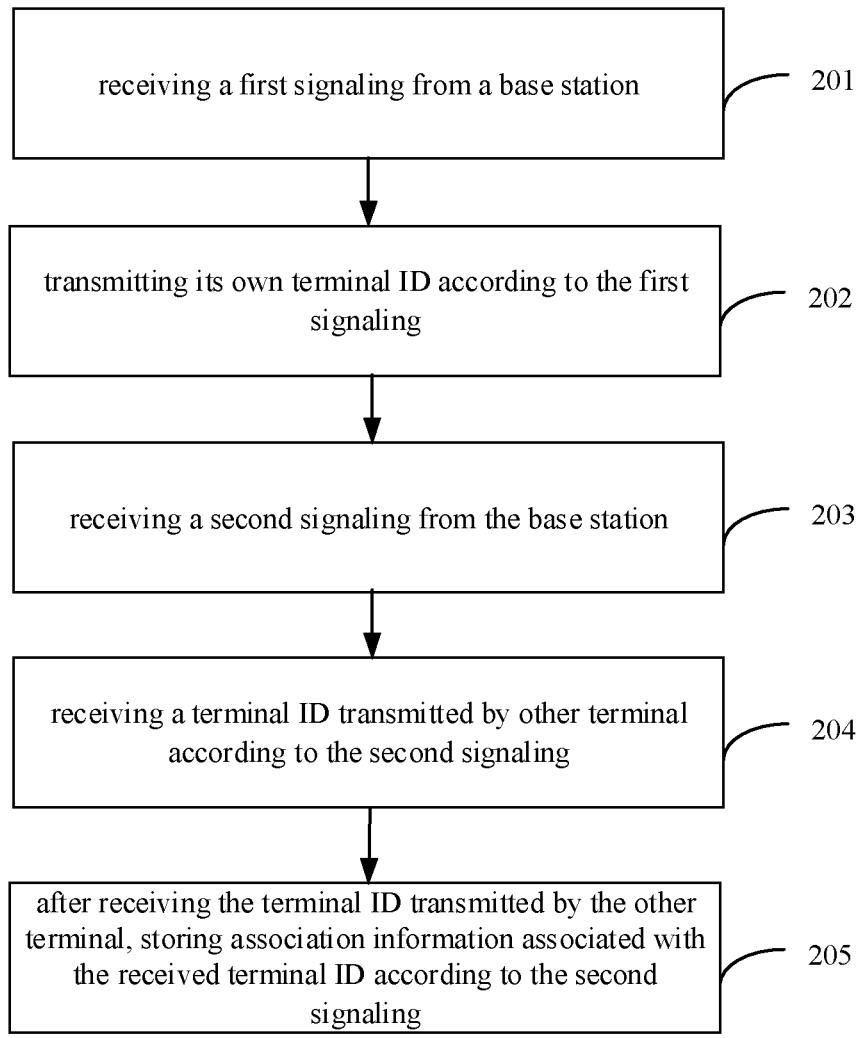
FIG. 6 is a flowchart of another method for tracking a terminal performed by a terminal, according to some embodiments.

In some embodiments, referring to FIG. 6, FIG. 6 is a flowchart of another method for tracking a terminal, according to some embodiments in FIG. 5. The method may further include the following step.

In step 205, after receiving the terminal ID transmitted by the other terminal, association information associated with the received terminal ID is stored according to the second signaling.

The association information includes at least one of: time when receiving the terminal ID transmitted by the other terminal, content of the received terminal ID transmitted by the other terminal, information on a base station connected when a current terminal is in the connected state or information on a base station that resides when the current terminal is in the idle state or inactive state, or geographic location information of the current terminal when receiving the terminal ID transmitted by other terminal.

Accordingly, step 205 may include the following: storing the time when receiving the terminal ID transmitted by the other terminal, storing at least one of: a S-TMSI, a TMSI, a random number for identifying the terminal, or identification information obtained after adding a preset field before the terminal ID, transmitted by the other terminal, storing information on a base station connected when a current terminal is in the connected state, storing information on a base station that resides when the current terminal is in the idle state or inactive state, or storing geographic location information of the current terminal when receiving the terminal ID transmitted by other terminal.

In the above embodiments, in addition to receiving the terminal ID transmitted by the other terminal according to the second signaling, the terminal may also store the association information according to the second signaling, so that it can be subsequently reported to the base station, thereby realizing the purpose of determining other terminal(s) around the terminal.

Figure 7:
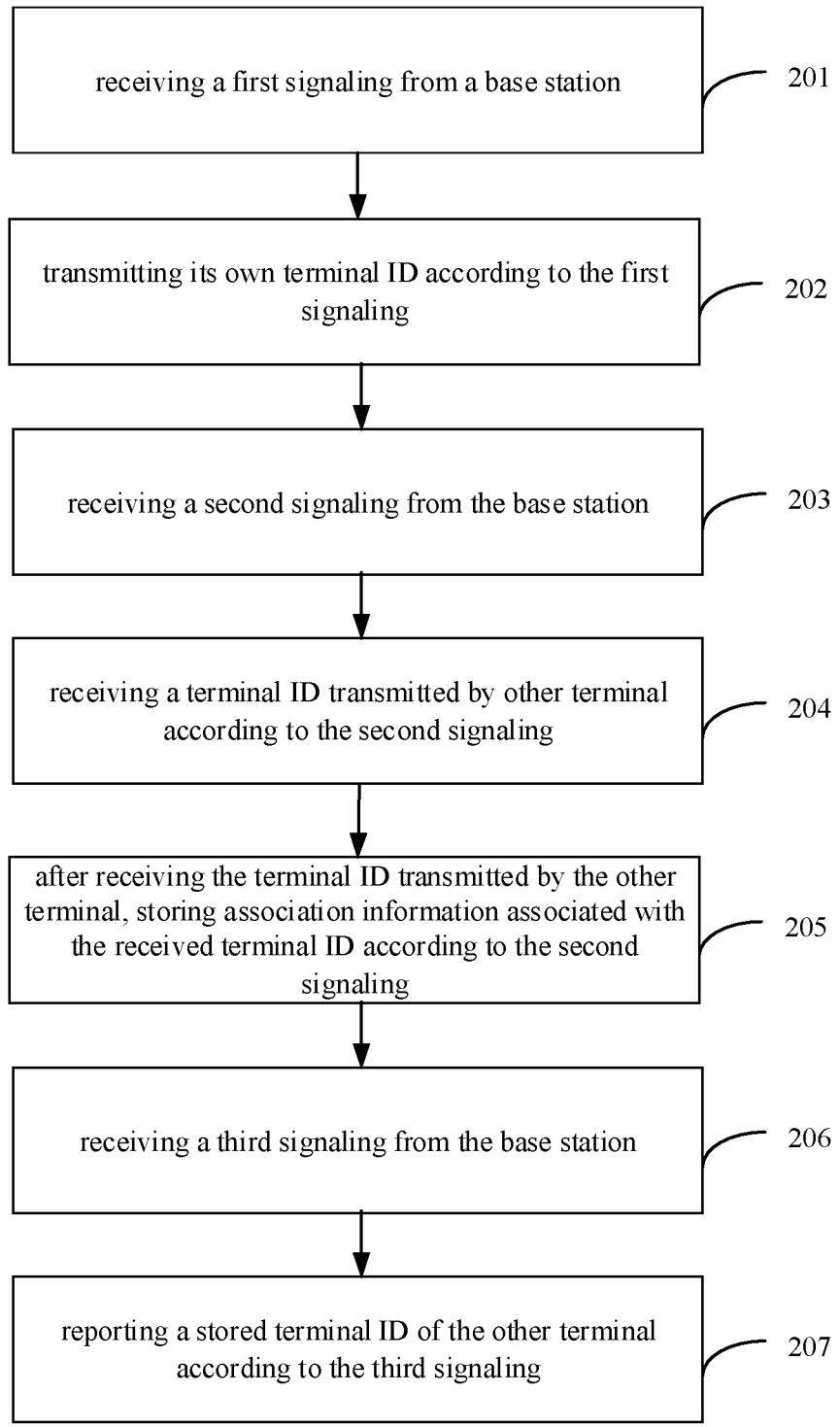
FIG. 7 is a flowchart of another method for tracking a terminal performed by a terminal, according to some embodiments.

In some embodiments, referring to FIG. 7, FIG. 7 is a flowchart of another method for tracking a terminal, according to some embodiments in FIG. 6, and the method may further include the following steps.

In step 206, a third signaling transmitted by the base station is received.

The third signaling is a signaling for the terminal to report the stored terminal identities of other terminals.

In step 207, the stored terminal ID of the other terminal is reported according to the third signaling.

In the foregoing embodiments, the base station may also transmit the third signaling to the at least one terminal, so that the terminal reports the stored terminal ID(s) of other terminal(s) according to the third signaling. In this way, the information of multiple terminals around one terminal is determined, and the purpose of tracking terminals is realized.

Similarly, when the terminal is in a connected state, the third signaling is a broadcast signaling or unicast signaling; and when the terminal is in an idle state or in an inactive state, the third signaling is a broadcast signaling.

In some embodiments, regardless of whether the third signaling is the broadcast signaling or unicast signaling, the terminal may report the terminal IDs of all other terminals stored by itself to the base station. Optionally, the terminal can also report other stored information, such as the time when the terminal receives the terminal ID transmitted by the other terminal, the information on the base station connected to the terminal when the terminal is in the connected state, the information on the base station where the terminal resides when the terminal is in the idle or inactive state, or geographic location information of the terminal, or the like.

Alternatively, the terminal may also report according to the third signaling when the designated terminal ID is stored in itself, and report the designated terminal ID, or report all the stored terminal IDs of other terminals.

Or the terminal may also report the stored terminal ID(s) of other terminal(s) according to the third signaling only when its own terminal ID is the designated terminal ID.

For example, if the designated terminal ID is the terminal ID of the user of the confirmed case, the terminal can report the designated terminal ID or all other terminal IDs stored in itself according to the third signaling if the designated terminal ID is stored in itself. Or the terminal may report other terminal IDs stored in itself according to the third signaling, if the terminal is corresponding to the designated terminal ID.

In the above-mentioned embodiments, the terminal ID(s) of other terminal(s) stored can be reported based on the third signaling. While the terminal tracking is realized, the designated terminal ID can also be tracked with emphasis, which is simple and highly usable.

Figure 8:
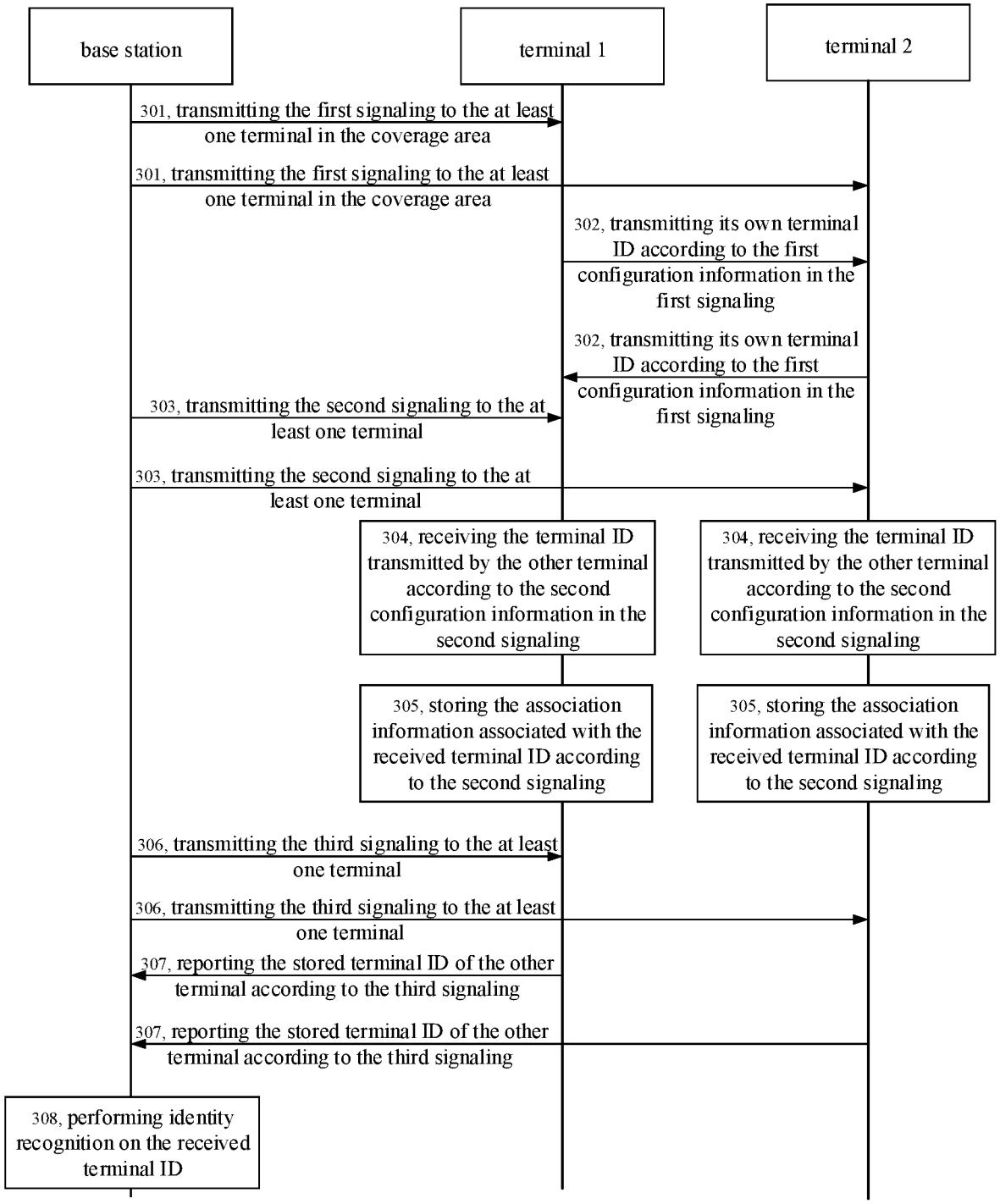
FIG. 8 is a flowchart of another method for tracking a terminal illustrating an exchange of signals between a base station and terminals, according to some embodiments.

In some embodiments, referring to FIG. 8, FIG. 8 is a flowchart of another method for tracking a terminal according to some embodiments, and the method may include the following steps.

In step 301, the base station transmits the first signaling to the at least one terminal in the coverage area.

The first signaling is configured for the at least one terminal to transmit its own terminal ID.

In step 302, the terminal transmits its own terminal ID according to the first configuration information in the first signaling.

In step 303, the base station transmits the second signaling to the at least one terminal.

The second signaling at least is configured to cause the at least one terminal to receive the terminal ID transmitted by the other terminal.

In step 304, the terminal receives the terminal ID transmitted by the other terminal according to the second configuration information in the second signaling.

In step 305, the terminal stores the association information associated with the received terminal ID according to the second signaling.

In step 306, the base station transmits a third signaling to the at least one terminal.

The third signaling is configured to cause the at least one terminal to report the stored terminal ID of the other terminal.

In step 307, the terminal reports the stored terminal ID of the other terminal according to the third signaling.

In step 308, the base station performs identity recognition on the received terminal ID.

In the above embodiments, the base station can cause the terminal to transmit its own terminal ID, to receive the terminal ID transmitted by the other terminal and to store the association information, and to report the stored terminal ID of the other terminal, through the different signalings, so that the base station or core network can perform identity recognition and can determine the information of other terminals around the terminal, and the states of these terminals can be connected, idle, or activated, which is easy to implement and high availability.

Corresponding to foregoing method embodiments of application function realization, the disclosure also provides some embodiments of apparatus embodiments of application function realization.

Figure 9:
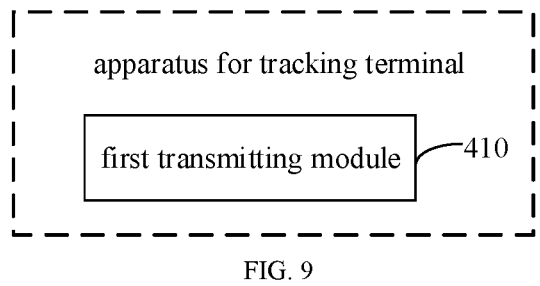
FIG. 9 is a block diagram of an apparatus for tracking a terminal, such as a base station, according to some embodiments.

Referring to FIG. 9, FIG. 9 is a block diagram of an apparatus for tracking a terminal, according to some embodiments. The apparatus is applicable to a base station and includes a first transmitting module 410.

The first transmitting module 410 is configured to transmit a first signaling to at least one terminal in a coverage area, in which the first signaling is configured to cause the at least one terminal to transmit its own terminal ID.

Figure 10:
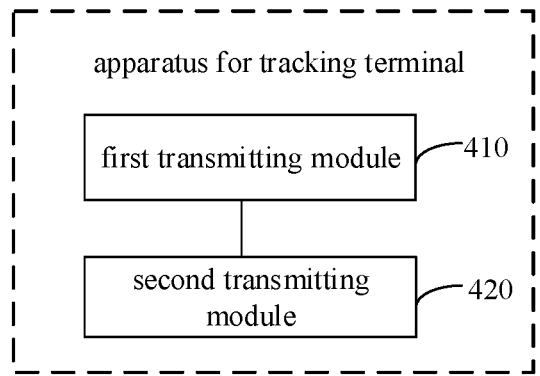
FIG. 10 is a block diagram of an apparatus for tracking a terminal, according to some embodiments.

Referring to FIG. 10, FIG. 10 is a block diagram of another apparatus for tracking a terminal, according to some embodiments in FIG. 9, and the apparatus further includes a second transmitting module 420.

The second transmitting module 420 is configured to transmit a second signaling to the at least one terminal, in which the second signaling at least is configured to cause the at least one terminal to receive a terminal ID transmitted by other terminal.

Optionally, the second signaling is further configured to cause the at least one terminal to store association information associated with the received terminal ID after receiving the terminal ID transmitted by the other terminal.

Figure 11:
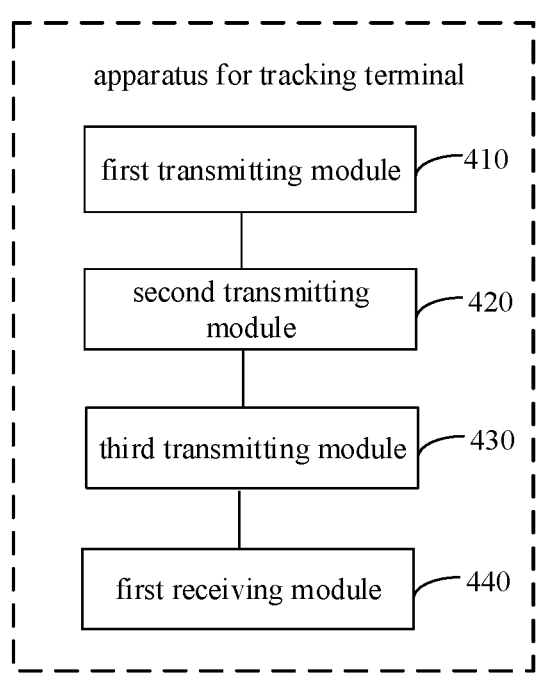
FIG. 11 is a block diagram of an apparatus for tracking a terminal, according to some embodiments of the disclosure.

Referring to FIG. 11, FIG. 11 is a block diagram of another apparatus for tracking a terminal, according to some embodiments in FIG. 10. The apparatus further includes a third transmitting module 430 and a first receiving module 440.

The third transmitting module 430 is configured to transmit a third signaling to the at least one terminal, in which the third signaling is configured to cause the at least one terminal to report a stored terminal ID of the other terminal.

The first receiving module 440 is configured to receive the stored terminal ID of the other terminal, reported by the at least one terminal.

Optionally, the third signaling is configured to cause a third terminal in the at least one terminal to report a stored designated terminal ID or all stored terminal IDs of other terminals, in which the third terminal is a terminal stored with the designated terminal ID.

Optionally, the third signaling is configured to cause a fourth terminal in the at least one terminal to report the stored terminal ID of the other terminal, in which the fourth terminal is a terminal corresponding to the designated terminal ID.

Figure 12A:
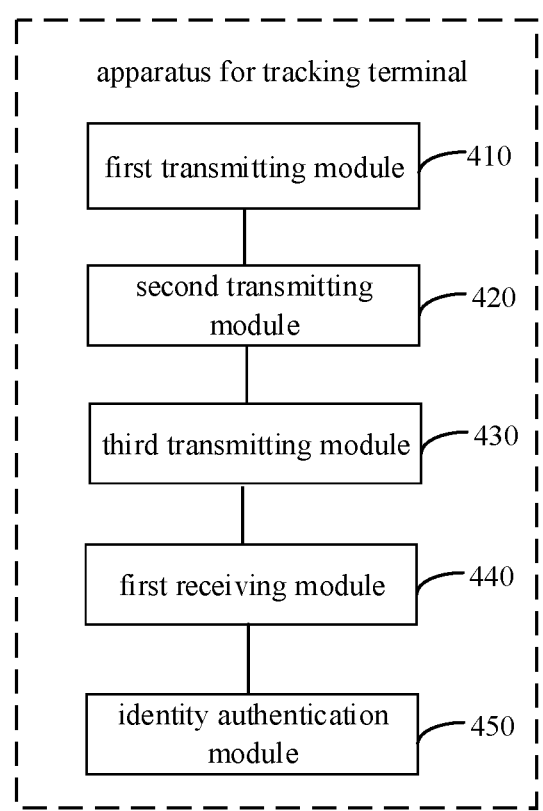
FIG. 12A is a block diagram of an apparatus for tracking a terminal, according to some embodiments of the disclosure.

Referring to FIG. 12A, FIG. 12A is a block diagram of another apparatus for tracking a terminal, according to some embodiments in FIG. 11. The apparatus further includes an identity authentication module 450.

The identity authentication module 450 is configured to identify the received terminal ID.

Figure 12B:
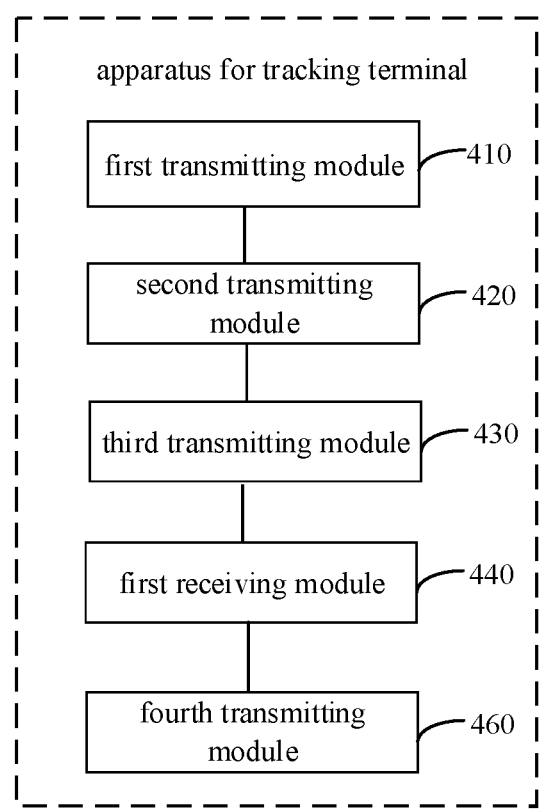
FIG. 12B is a block diagram of an apparatus for tracking a terminal, according to some embodiments of the disclosure.

Referring to FIG. 12B, FIG. 12B is a block diagram of another apparatus for tracking a terminal, according to some embodiments in FIG. 11. The apparatus further includes a fourth transmitting module 460.

The fourth transmitting module 460 is configured to transmit the received terminal ID to a core network, in which the core network identifies the terminal ID received by the base station.

Figure 13:
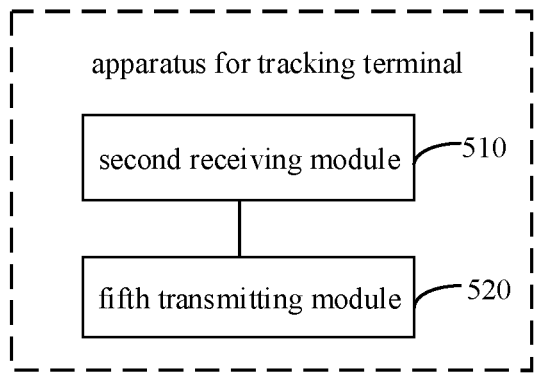
FIG. 13 is a block diagram of an apparatus for tracking a terminal, as implemented in a terminal, according to some embodiments.

Referring to FIG. 13, FIG. 13 is a block diagram of another apparatus for tracking a terminal, according to some embodiments. The apparatus is applicable to a terminal and includes a second receiving module 510 and a fifth transmitting module 520.

The second receiving module 510 is configured to receive a first signaling transmitted by a base station.

The fifth transmitting module 520 is configured to transmit its own terminal ID according to the first signaling.

Figure 14:
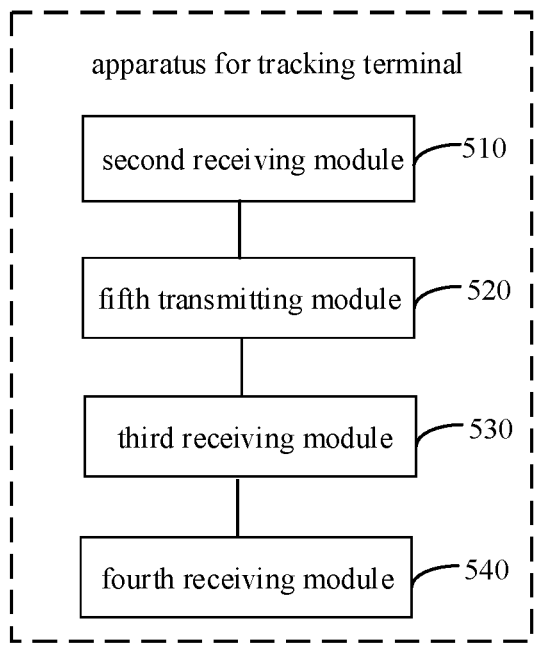
FIG. 14 is a block diagram of an apparatus for tracking a terminal, according to some embodiments of the disclosure.

Referring to FIG. 14, FIG. 14 is a block diagram of another apparatus for tracking a terminal, according to some embodiments in FIG. 13, and the apparatus further includes a third receiving module 530 and a fourth receiving module 540.

The third receiving module 530 is configured to receive a second signaling from the base station.

The fourth receiving module 540 is configured to receive a terminal ID transmitted by other terminal according to the second signaling.

Figure 15:
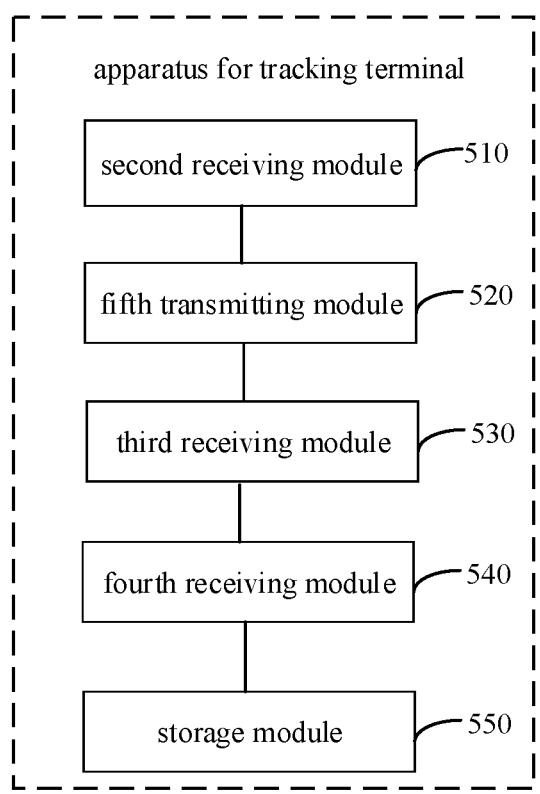
FIG. 15 is a block diagram of an apparatus for tracking a terminal, according to some embodiments of the disclosure.

Referring to FIG. 15, FIG. 15 is a block diagram of another apparatus for tracking a terminal, according to some embodiments in FIG. 14, and the apparatus further includes a storage module 550.

The storage module 550 is configured to store association information associated with the received terminal ID after receiving the terminal ID transmitted by the other terminal according to the second signaling.

Figure 16:
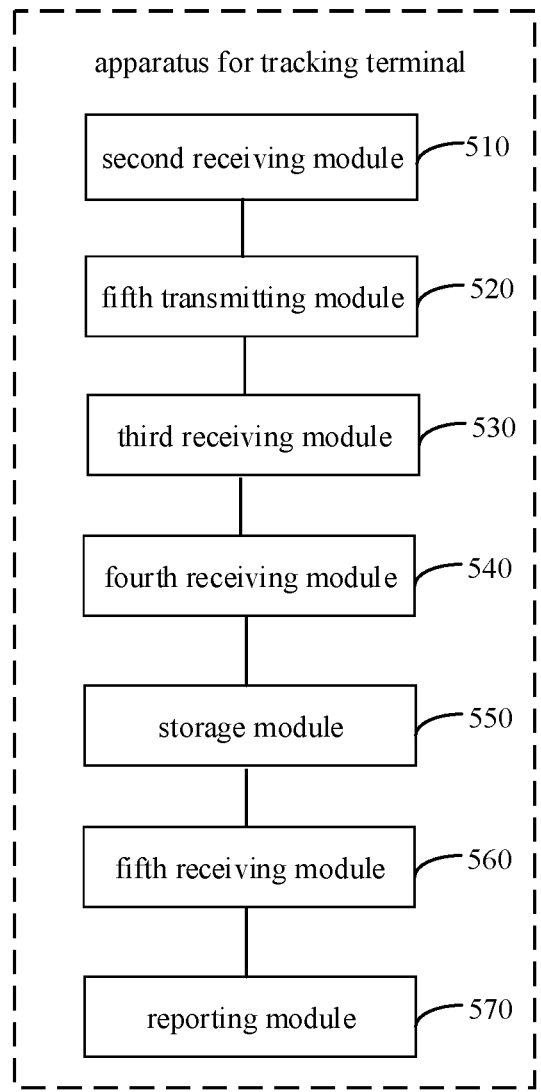
FIG. 16 is a block diagram of an apparatus for tracking a terminal, according to some embodiments of the disclosure.

Referring to FIG. 16, FIG. 16 is a block diagram of another apparatus for tracking a terminal, according to some embodiments in FIG. 15, and the apparatus further includes a fifth receiving module 560 and a reporting module 570.

The fifth receiving module 560 is configured to receive a third signaling transmitted by the base station.

The reporting module 570 is configured to report a stored terminal ID of the other terminal according to the third signaling.

Figure 17:
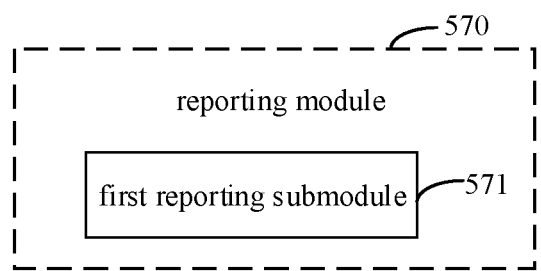
FIG. 17 is a block diagram of an apparatus for tracking a terminal, according to some embodiments of the disclosure.

Referring to FIG. 17, FIG. 17 is a block diagram of another apparatus for tracking a terminal, according to some embodiments in FIG. 16. The reporting module 570 includes a first reporting submodule 571.

The first reporting submodule 571 is configured to report a designated terminal ID in response to the designated terminal ID being stored or reporting all stored terminal IDs of other terminals, according to the third signaling.

Figure 18:
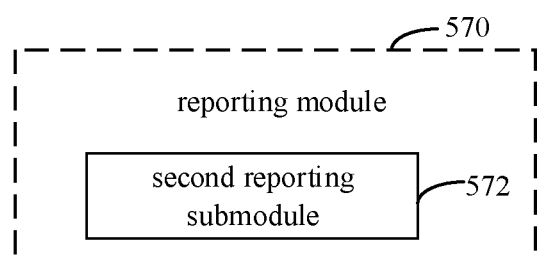
FIG. 18 is a block diagram of an apparatus for tracking a terminal, according to some embodiments of the disclosure.

Referring to FIG. 18, FIG. 18 is a block diagram of another apparatus for tracking a terminal, according to some embodiments in FIG. 16. The reporting module 570 includes a second reporting submodule 572.

The second reporting submodule 572 is configured to report the stored terminal ID of the other terminal according to the third signaling in response to a terminal ID of the terminal itself being a designated terminal ID.

For the apparatus embodiments, since they basically correspond the method embodiments, the relevant part can refer to the description of the method embodiments. The apparatus embodiments described above are merely illustrative. The modules described as separate components may or may not be physically separated, and the components displayed as modules may or may not be physical modules, that is, they may be located in one place or distributed to multiple network modules. Some or all of the modules can be selected according to actual needs to achieve the objectives of the solutions of the embodiments. Those of ordinary skill in the art can understand and implement without creative work.

Correspondingly, the disclosure also provides a computer-readable storage medium that stores a computer program, and the computer program is configured to execute any of methods for tracking a terminal described above for the base station side.

Correspondingly, the disclosure also provides a computer-readable storage medium that stores a computer program, and the computer program is configured to execute any of methods for tracking a terminal described above for the terminal side.

Correspondingly, the disclosure also provides a device for tracking a terminal, including: a processor; and a memory for storing instructions executable by processor; in which, the processor is configured to perform any of methods for tracking a terminal for the base station side.

Figure 19:
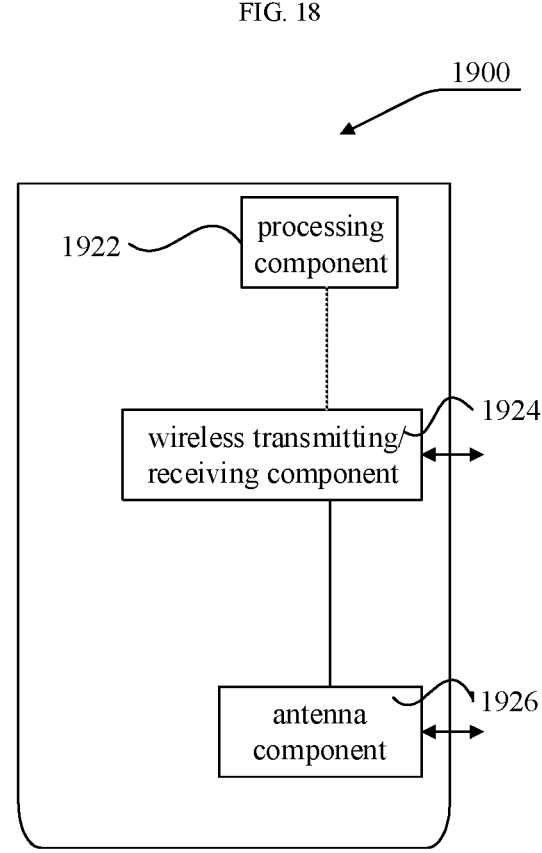
FIG. 19 is a block diagram of a device for tracking a terminal, according to some embodiments of the disclosure.

As illustrated in FIG. 19, FIG. 19 is a block diagram of a device 1900 for tracking a terminal, according to some embodiments of the disclosure. The device 1900 may be provided as a base station. Referring to FIG. 19, the device 1900 includes a processing component 1922, a wireless transmitting/receiving component 1924, an antenna component 1926, and a signal processing part specific to a wireless interface. The processing component 1922 may further include one or more processors.

One of processors in the processing component 1922 may be configured to execute any of methods for tracking a terminal.

Correspondingly, the disclosure also provides a device for tracking a terminal, including: a processor; and a memory for storing instructions executable by processor; in which, the processor is configured to perform any of methods for tracking a terminal for the terminal side.

Figure 20:
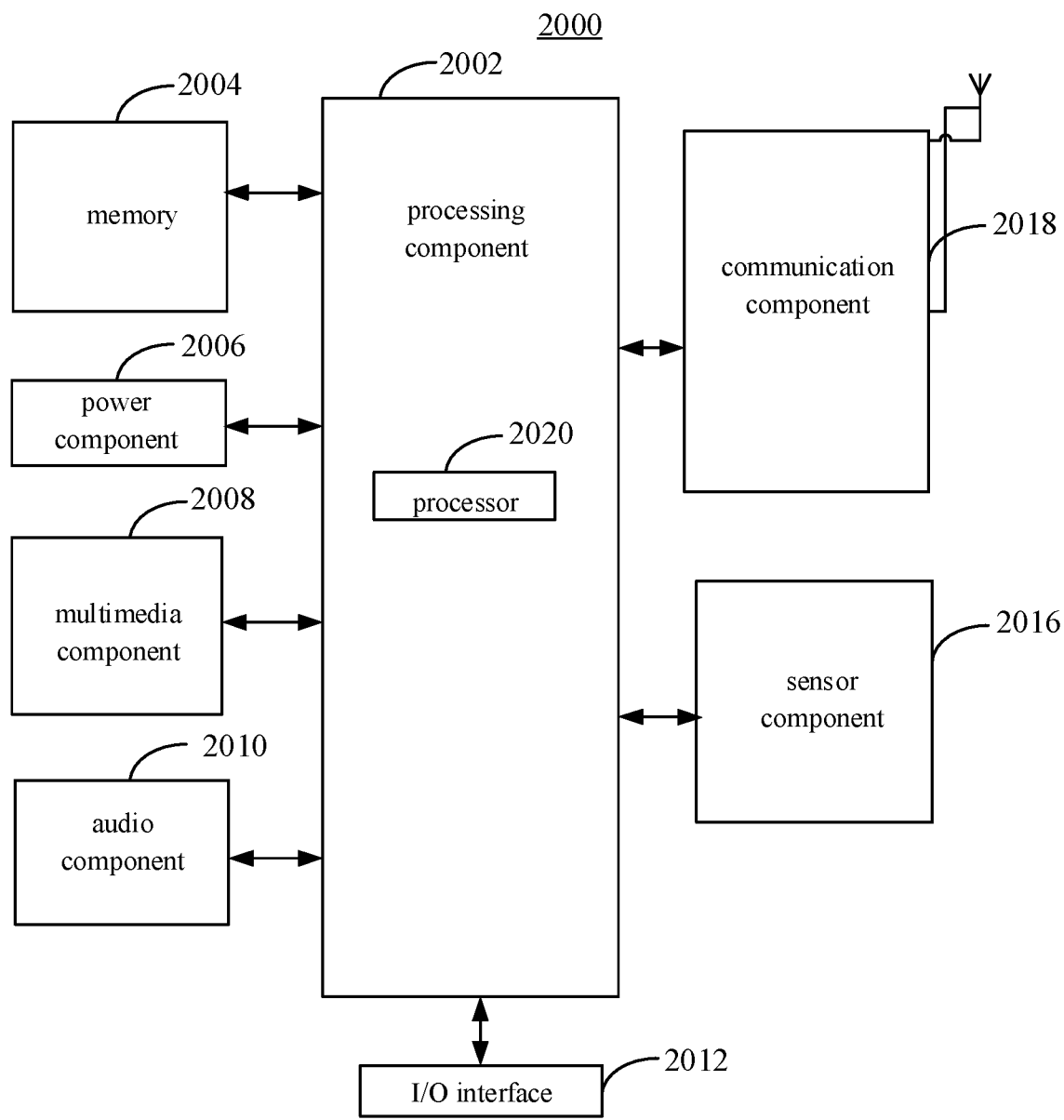
FIG. 20 is a block diagram of another device for tracking a terminal, according to some embodiments of the disclosure.

FIG. 20 is a block diagram of an electronic device 2000, according to some embodiments of the disclosure. For example, the device 2000 may be a mobile phone, a tablet computer, an e-book reader, a multimedia player device, a wearable device, a car terminal, an ipad, a smart TV or the like terminal.

Referring to FIG. 20, the device 2000 may include one or more of the following components: a processing component 2002, a memory 2004, a power component 2006, a multimedia component 2008, an audio component 2010, an input/output (I/O) interface 2012, a sensor component 2016, and a communication component 2018.

The processing component 2002 typically controls overall operations of the device 2000, such as the operations associated with display, telephone calls, data communications, camera operations, and recording operations. The processing component 2002 may include one or more processors 2020 to execute instructions to perform all or part of the steps in the above described methods. Moreover, the processing component 2002 may include one or more modules which facilitate the interaction between the processing component 2002 and other components. For instance, the processing component 2002 may include a multimedia module to facilitate the interaction between the multimedia component 2008 and the processing component 2002. As another example, the processing component 2002 may read executable instructions from a memory to implement the steps of a method for tracing a terminal provided in each of the above embodiments.

The memory 2004 is configured to store various types of data to support the operation of the device 2000. Examples of such data include instructions for any applications or methods operated on the device 2000, contact data, phonebook data, messages, pictures, video, etc. The memory 2004 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 2006 provides power to various components of the device 2000. The power component 2006 may include a power management system, one or more power sources, and any other components associated with the generation, management, and distribution of power in the device 2000.

The multimedia component 2008 includes a screen providing an output interface between the device 2000 and the user. In some embodiments, the multimedia component 2008 includes a front camera and/or a rear camera. The front camera and the rear camera may receive an external multimedia datum while the device 2000 is in an operation mode, such as a photographing mode or a video mode. Each of the front camera and the rear camera may be a fixed optical lens system or have focus and optical zoom capability.

The audio component 2010 is configured to output and/or input audio signals. For example, the audio component 2010 includes a microphone ("MIC") configured to receive an external audio signal when the device 2000 is in an operation mode, such as a call mode, a recording mode, and a voice recognition mode. The received audio signal may be further stored in the memory 2004 or transmitted via the communication component 2018. In some embodiments, the audio component 2010 further includes a speaker to output audio signals.

The I/O interface 2012 provides an interface between the processing component 2002 and peripheral interface modules, such as a keyboard, a click wheel, buttons, and the like. The buttons may include, but are not limited to, a home button, a volume button, a starting button, and a locking button.

The sensor component 2016 includes one or more sensors to provide status assessments of various aspects of the device 2000. For instance, the sensor component 2016 may detect an open/closed status of the device 2000, relative positioning of components, e.g., the display and the keypad, of the device 2000, a change in position of the device 2000 or a component of the device 2000, a presence or absence of user contact with the device 2000, an orientation or an acceleration/deceleration of the device 2000, and a change in temperature of the device 2000. The sensor component 2016 may include a proximity sensor configured to detect the presence of nearby objects without any physical contact. The sensor component 2014 may also include a light sensor, such as a CMOS or CCD image sensor, for use in imaging applications. In some embodiments, the sensor component 2016 may also include an accelerometer sensor, a gyroscope sensor, a magnetic sensor, a pressure sensor, or a temperature sensor.

The communication component 2018 is configured to facilitate communication, wired or wirelessly, between the 200device 2000 and other devices. The 200device 2000 can access a wireless network based on a communication standard, such as WiFi, 2G, 3G, 4G, or 5G NR, or a combination thereof. In one some embodiment, the communication component 2018 receives a broadcast signal or broadcast associated information from an external broadcast management system via a broadcast channel. In one some embodiment, the communication component 2018 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the device 2000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, there is also provided a non-transitory computer readable storage medium including instructions, such as included in the memory 2004, executable by the processor 2020 in the device 2000, for performing the above-described methods. For example, the non-transitory computer-readable storage medium may be a ROM, a RAM, a CD-ROM, a magnetic tape, a floppy disc, an optical data storage device, and the like.

The technical solutions provided in embodiments of the disclosure may include the following beneficial effects.

In some embodiments of the disclosure, the base station may transmit the first signaling to the at least one terminal in its own coverage area, so that the at least one terminal transmits its own terminal ID. The at least one terminal is not limited to the terminal in the connected state, but may also the terminal in the idle state or the inactive state, so as to achieve the purpose of tracking terminals in different states.

In some embodiments of the disclosure, the base station may also transmit the second signaling to the at least one terminal in its own coverage area, so that the at least one terminal receives the terminal ID transmitted by the other terminal according to the second signaling, and the information on the other terminal around the terminal can be determined, so as to achieve the purpose of tracking terminals.

In some embodiments of the disclosure, the base station may also use the second signaling to cause the at least one terminal to store corresponding association information after the terminal ID transmitted by the other terminal is received, so as to subsequently report it to the base station, which is simple to implement and has high availability.

In some embodiments of the disclosure, the base station may also transmit the third signaling to the at least one terminal, so that the terminal reports the stored terminal ID of the other terminal according to the third signaling. In this way, the information of multiple terminals around the terminal is determined, and the purpose of tracking terminals is realized.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only It will be appreciated that the disclosure is not limited to the exact construction that has been described above and illustrated in the accompanying drawings, and that various modifications and changes can be made without departing from the scope thereof.

The invention claimed is:

1. A method for tracking a terminal, performed by a base station, comprising:
   transmitting a first signaling to at least one terminal in a coverage area, wherein the at least one terminal transmits its own terminal ID in accordance with the first signaling; and
   transmitting a second signaling to the at least one terminal, wherein the at least one terminal receives a terminal ID transmitted by other terminal in accordance with the second signaling.

2. The method according to claim 1, wherein,
   the first signaling comprises a broadcast signaling in response to the at least one terminal comprising a terminal in a target state, in which the target state comprises an idle state, an inactive state or a connected state; or
   the first signaling comprises a unicast signaling in response to the at least one terminal comprising a terminal in a connected state,
   wherein, the first signaling comprises a newly added system information block signaling in response to the first signaling comprising the broadcast signaling; or
   the first signaling comprises a radio resource control reconfiguration signaling in response to the first signaling comprising the unicast signaling.

3. The method according to claim 1, wherein the first signaling carries first configuration information; in which the first configuration information is configured to inform the at least one terminal of transmitting configuration information when transmitting its own terminal ID,
   wherein the first configuration information comprises at least one of:
   at least one of a transmission frequency and a transmission time period when transmitting the terminal ID, content of the transmitted terminal ID, an algorithm used when transmitting the terminal ID, a resource location when transmitting the terminal ID; a communication mode used when transmitting the terminal ID, or a signal transmission power used when transmitting the terminal ID.

4. The method according to claim 1, wherein,
   the second signaling comprises a broadcast signaling in response to the at least one terminal comprising a terminal in a target state, in which the target state comprises an idle state, an inactive state or a connected state; or
   the second signaling comprises a unicast signaling in response to the at least one terminal comprising a terminal in a connected state,
   wherein in response to the second signaling comprising the unicast signaling, the second signaling is further configured to cause the terminal in the connected state to receive the terminal ID transmitted by the other terminal after switching from the connected state to the inactive state or the idle state.

5. The method according to claim 1, wherein the second signaling carries second configuration information; in which the second configuration information is configured to inform the at least one terminal of receiving configuration information when receiving the terminal ID transmitted by the other terminal, wherein the second configuration information comprises at least one of:
at least one of a frequency and a time period when receiving the terminal ID transmitted by the other terminal, content of the received terminal ID transmitted by the other terminal, a resource location when receiving the terminal ID transmitted by the other terminal; a communication mode used when receiving the terminal ID transmitted by the other terminal, or a receiving condition when receiving the terminal ID transmitted by the other terminal.

6. The method according to claim 1, wherein the at least one terminal stores association information associated with received terminal ID in accordance with the second signaling after receiving the terminal ID transmitted by the other terminal,
wherein the association information comprises at least one of:
time when receiving the terminal ID transmitted by the other terminal, content of the received terminal ID transmitted by the other terminal, information on a base station connected when a current terminal is in a connected state or information on a base station that resides when the current terminal is in an idle state or inactive state, or geographic location information of the current terminal when receiving the terminal ID transmitted by other terminal.

7. The method according to claim 1, further comprising:
transmitting a third signaling to the at least one terminal, wherein the at least one terminal reports a stored terminal ID of the other terminal in accordance with the third signaling; and
receiving the stored terminal ID of the other terminal, reported by the at least one terminal.

8. The method according to claim 7, wherein,
the third signaling comprises a broadcast signaling in response to the at least one terminal comprising a terminal in a target state, in which the target state comprises an idle state, an inactive state or a connected state; or
the third signaling comprises a unicast signaling in response to the at least one terminal comprising a terminal in a connected state.

9. The method according to claim 7, wherein a third terminal in the at least one terminal reports a stored designated terminal ID or all stored terminal IDs of other terminals in accordance with the third signaling, in which the third terminal is a terminal stored with the designated terminal ID, or
wherein a fourth terminal in the at least one terminal reports the stored terminal ID of the other terminal in accordance with the third signaling, in which the fourth terminal is a terminal corresponding to the designated terminal ID.

10. The method according to claim 7, further comprising:
identifying the received terminal ID; or
transmitting the received terminal ID to a core network, to cause the core network to identify the terminal ID received by the base station.

11. A method for tracking a terminal, performed by a terminal, comprising:
receiving a first signaling from a base station;
transmitting its own terminal ID according to the first signaling;
receiving a second signaling from the base station; and
receiving a terminal ID transmitted by other terminal according to the second signaling.

12. The method according to claim 11, wherein transmitting its own terminal ID according to the first signaling comprises:
transmitting its own terminal ID according to first configuration information in the first signaling.

13. The method according to claim 11, wherein receiving the terminal ID transmitted by the other terminal according to the second signaling comprises:
receiving the terminal ID transmitted by the other terminal after the terminal switches from a connected state to an inactive state or an idle state.

14. The method according to claim 11, wherein receiving the terminal ID transmitted by the other terminal according to the second signaling comprises:
receiving the terminal ID transmitted by the other terminal according to second configuration information carried in the second signaling, or
after receiving the terminal ID transmitted by the other terminal, storing association information associated with the received terminal ID according to the second signaling.

15. The method according to claim 11, further comprising:
receiving a third signaling from the base station; and
reporting a stored terminal ID of the other terminal according to the third signaling.

16. The method according to claim 15, wherein reporting the stored terminal ID of the other terminal according to the third signaling comprises:
reporting a designated terminal ID in response to the designated terminal ID being stored or reporting all stored terminal IDs of other terminals, according to the third signaling, or
reporting the stored terminal ID of the other terminal according to the third signaling in response to a terminal ID of the terminal itself being a designated terminal ID.

17. A device for tracking a terminal, applicable to a base station, comprising:
a processor; and
a memory for storing instructions executable by processor;
wherein the processor is configured to:
transmit a first signaling to at least one terminal in a coverage area, wherein the at least one terminal transmits its own terminal ID in accordance with the first signaling; and
transmit a second signaling to the at least one terminal, wherein the at least one terminal receives a terminal ID transmitted by other terminal in accordance with the second signaling.

18. A device for tracking a terminal, applicable to a terminal, comprising:
a processor; and
a memory for storing instructions executable by processor;
wherein the processor is configured to perform the method for tracking a terminal as claimed in claim 11.

* * * * *